United States Patent [19]

Hild

[11] 4,032,001
[45] June 28, 1977

[54] DETACHABLE CONVEYOR BUCKET APPARATUS

[76] Inventor: Danny L. Hild, P.O. Box 284, Tribune, Kans. 67879

[22] Filed: Sept. 2, 1975

[21] Appl. No.: 609,670

[52] U.S. Cl. .............................................. 198/711
[51] Int. Cl.² ........................................ B65G 15/00
[58] Field of Search .......... 198/151, 150, 140, 711, 198/712; 248/225, 224

[56] References Cited

UNITED STATES PATENTS 2,271,928  2/1942  Sims .................................. 248/224

FOREIGN PATENTS OR APPLICATIONS 402,233  9/1924  Germany ........................... 198/151
489,698  1/1930  Germany ........................... 198/151

Primary Examiner—Evon C. Blunk
Assistant Examiner—Douglas D. Watts
Attorney, Agent, or Firm—John H. Widdowson; Edwin H. Crabtree

[57] ABSTRACT

A detachable conveyor bucket apparatus attached to an endless conveyor belt. The apparatus used with a plurality of buckets to quickly detach and mount the buckets on the conveyor belt used in transferring grain in a grain elevator.

2 Claims, 9 Drawing Figures

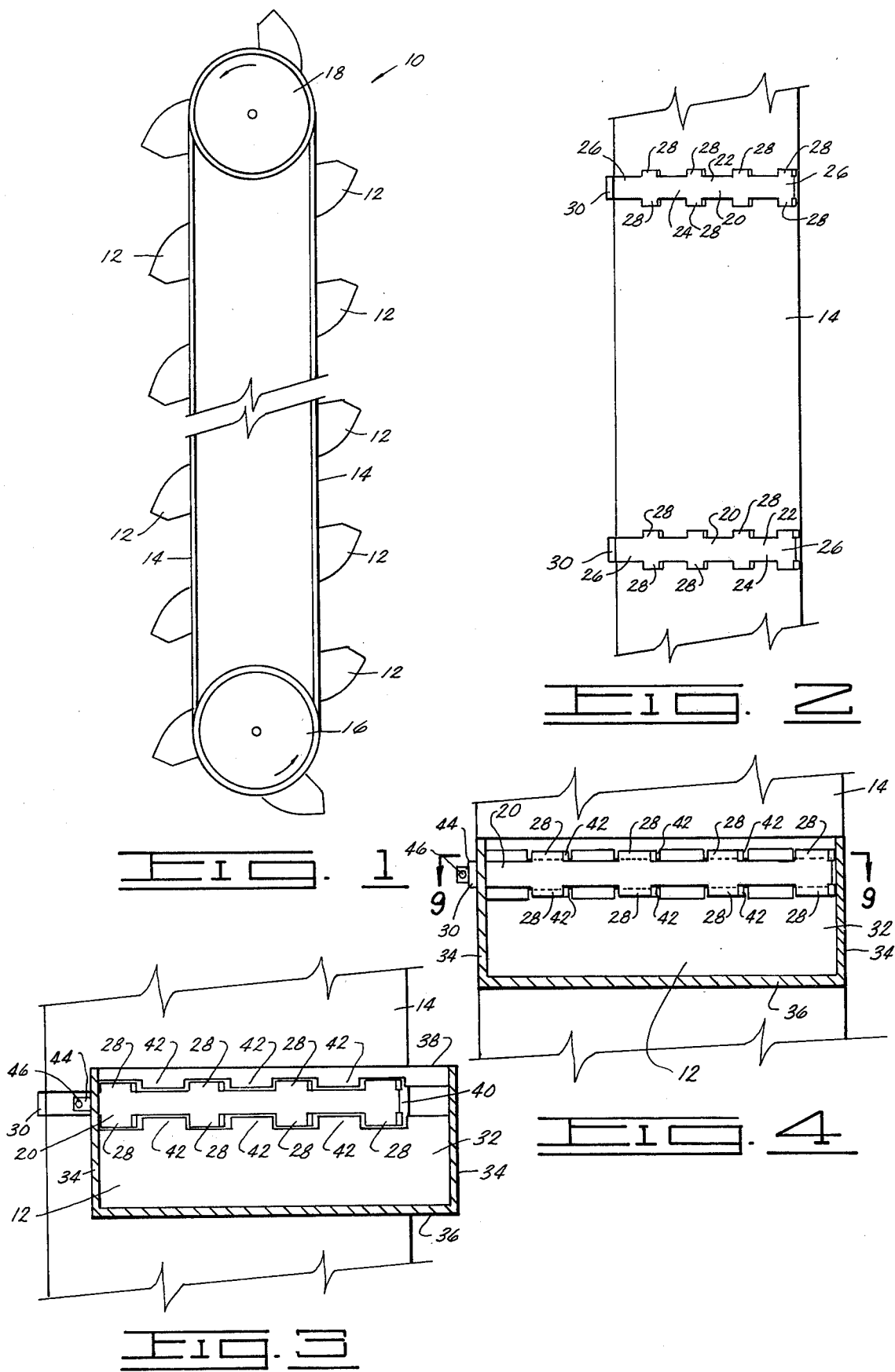

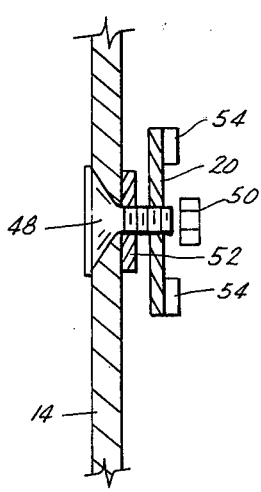
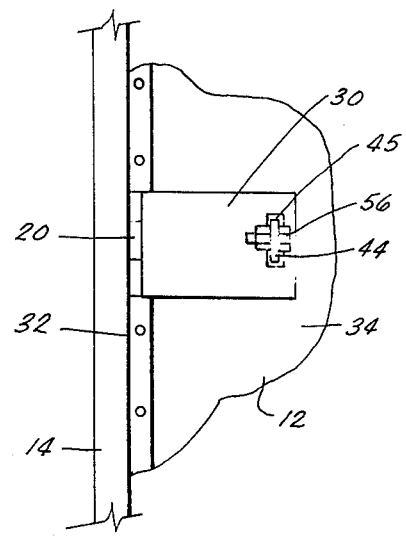
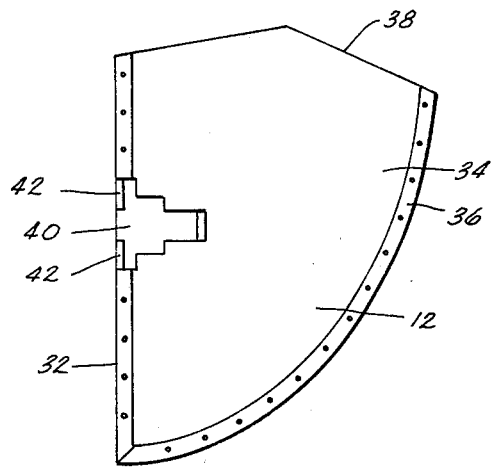
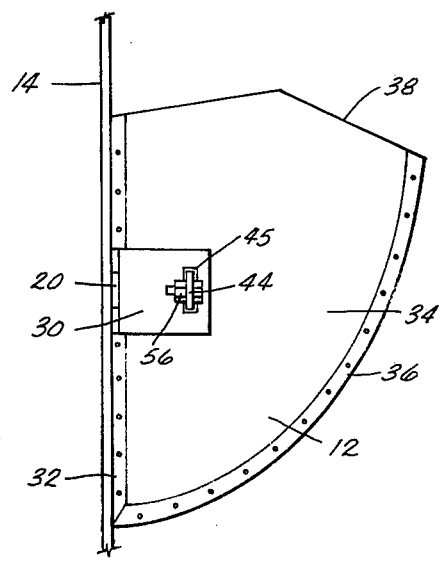
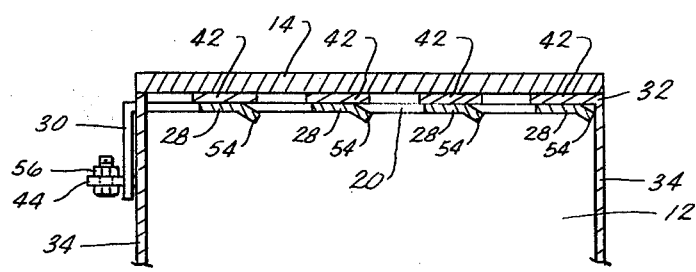

DETACHABLE CONVEYOR BUCKET APPARATUS

BACKGROUND OF THE INVENTION

Grain buckets used in a grain elevator are normally bolted directly to an endless conveyor belt. Each year a number of the grain buckets must be replaced because of wear. The replacement of the buckets is time consuming because three or four bolts and nuts must be removed to replace each bucket.

Heretofore there have been a variety of different types of bucket mountings and brackets for buckets, for securing the buckets to the conveyor belt. These different types of devices are designed for quick detachment of the bucket. None of the prior art devices disclose the novel structure of the subject detachable conveyor bucket apparatus.

BACKGROUND OF THE INVENTION

The detachable conveyor bucket apparatus provides a means for quickly removing worn grain buckets without having to remove any bucket bolts and nuts. A new bucket can be quickly installed and rigidly secured to the conveyor belt. The apparatus saves time and labor and is easily constructed to adapt to different types of endless conveyor belts.

The subject invention includes an elongated bracket permanently mounted to the conveyor belt. The bracket has spaced U-shaped bracket flanges extending outwardly from the top and bottom of the bracket. The rear portion of the grain bucket has an elongated slot which is substantially a mirror image of the bracket but slightly larger. The bracket is inserted into the slot at the rear of the bucket and therethrough. The bucket is then slid laterally across the width of the conveyor belt until the U-shaped flanges of the bracket are positioned behind the U-shaped slot flanges in the slot. The bucket is pinned to a bracket arm positioned at one end of the bracket thereby securing the bucket rigidly in place between the bracket and the conveyor belt.

BRIEF DESCRIPTION OF THE DRAWINGS

FIG. 1 is a side view of a grain elevator with an endless conveyor belt and grain buckets attached thereto.

FIG. 2 is a front sectional view of the conveyor belt with the brackets mounted to the belt.

FIG. 3 is a front view of the conveyor belt with the bracket and a sectional front view of the bucket. The bracket is inserted into the elongated slot.

FIG. 4 is similar to FIG. 3 with the bucket moved laterally across the width of the conveyor belt securing the rear portion of the bucket between the bracket and the conveyor belt.

FIG. 5 is a side view shown in section with an elevator bolt attaching a spacer and the bracket to the conveyor belt.

FIG. 6 is a partial side view of the conveyor belt with the bucket secured to a bracket arm of the bracket.

FIG. 7 is a side view of the bucket.

FIG. 8 is a side view of the bucket secured to the bracket arm.

FIG. 9 is a top view of the bracket and bucket taken along section 9—9 shown in FIG. 4.

DETAILED DESCRIPTION OF THE DRAWINGS

In FIG. 1 a typical grain bucket conveyor system is shown. The system is characterized by general reference number 10. The system 10 includes grain buckets 12, a conveyor belt 14, a conveyor belt drive 16 and an idler pulley 18.

In FIG. 2 a front sectional view of the conveyor belt 14 is shown. Attached to the conveyor belt 14, and transversely positioned across its width is an elongated bracket 20. The bracket 20 includes a top portion 22, a bottom portion 24, and end portions 26. Top portion 22 and bottom portion 24 include outwardly extending U-shaped bracket flanges 28 equally spaced one from the other. The bracket 20 further includes a bracket arm 30 positioned at the end portion 26. The arm 30 is bent at substantially right angles to the bracket 20.

FIG. 3 illustrates a sectional view of the bucket 12 positioned in front of the bracket 20. The bucket 12 includes a rear portion 32, side portions 34, slopping front portion 36 and an open top portion 38. The rear portion 32 of the bucket 12 includes an elongated slot 40 which is substantially a mirror image of the bracket 20 but slightly larger. The slot 40 includes U-shaped slot flanges 42 similar to the bracket flanges 28. The slot flanges 42 are equally spaced one from the other.

In operation the bucket 12 is mounted to the bracket 20 by inserting the rear portion 32 of the bucket 12 through the slot 40. The rear portion 32 of the bucket 12 is now positioned between the bracket 20 and the belt 14. In FIG. 4 the bucket 12 is shown having been moved laterally to the left with the U-shaped slot flanges 42 of the bucket 12 now positioned behind the U-shaped bracket flanges 28. The slot flanges 42 are now engaged between the belt 14 and the bracket flanges 28.

The bucket 12 can be detached by reversing the above equation and moving the bucket 12 to the right and removing the bracket 20 through the slot 40.

When the bucket 12 is engaged between the belt 14 and the bracket 20 as shown in FIG. 4 the bucket 12 is held in place by a pin 44 which is mounted to the side portion 34 of the bucket 12. The pin 44 is received and inserted through an aperture 45, which is shown in FIG. 6, in the bracket arm 30. The pin 44 is then bolted to the arm 30 through a pin aperture 46.

In FIG. 5 a side sectional view of the belt 14 and the bracket 20 is shown. This view illustrates how the bracket 20 is permanently mounted to the belt 14 by a bolt 48 and nut 50. The provide room between the belt 14 and the bracket 20 for the slot flanges 42 of the bucket 12, an elongated spacer 52 is secured to the bolt 48. The spacer 52 is substantially the same thickness as the thickness of the rear portion 32 of the bucket 12. Also shown in this figure is an angled side portion 54 of the U-shaped flanges 28 of the bracket 20. The angled side portions 54 are used as a guide in sliding the slot flanges 42 between the belt 41 and the bracket 20.

FIG. 6 is a partial side view of the bucket 12 with rear portion 32 engaged between the bracket 20 and the conveyor belt 14. Shown in this view is a bolt 56 secured to the bucket pin 44 which is inserted through aperture 45 of the bracket arm 30 to secure the bucket 12 in place.

FIG. 7 shows a complete side view of the bucket 12 with side portion 34, open top portion 38, and slopping front portion 36. Rear portion 32 is seen showing a side view of the slot 40 and the U-shaped slot flanges 42.

FIG. 8 is a similar view of the bucket 12 seen in FIG. 7 but in this view the bucket 12 is engaged by the bracket 20 and held in place as described in the description of FIG. 6.

FIG. 9 is a top sectional view taken along lines 9—9 shown in FIG. 4. In this view the rear portion 32 of the bucket 12 is engaged between the belt 14 and the bracket 20. The U-shaped slot flanges 42 can be seen positioned behind the U-shaped bracket flanges 28 and parallel thereto. The angled side portion 54 of the bracket flanges 28 is also clearly seen. As mentioned in the description of FIG. 5, the angled side portions 54 help guide the slot flanges 42 into position behind the bracket flanges 28.

Changes may be made in the construction and arrangement of the parts or elements of the embodiments as disclosed herein without departing from the spirit or scope of the invention as defined in the following claims.

I claim:

1. A detachable conveyor bucket apparatus, the apparatus attached to an endless conveyor belt, the apparatus comprising:

an elongated bracket transversely mounted to the conveyor belt, said bracket having a top and bottom portion with U-shaped bracket flanges extending outwardly therefrom and equally spaced one from the other; and a bucket having side portions, a front portion, a rear portion and an open top portion, the rear portion having an elongated slot having U-shaped slot flanges, the elongated slot being substantially a mirror image of said elongated bracket, said bracket inserted into the slot and therethrough, said bucket moved laterally along the length of said bracket until the U-shaped slot flanges are positioned behind the U-shaped bracket flanges thereby engaging the rear portion of said bucket between said bracket and the conveyor belt;

a side portion of the U-shaped bracket flanges of said bracket is projected outwardly at an angle to the length of said bracket, the angled side portion used as a guide in sliding the slotted rear portion of said bucket when the rear portion of said bucket is engaged between the conveyor belt and said bracket.

2. The apparatus as described in claim 1 wherein said bracket includes a bracket arm attached thereto and positioned at one end thereof, said bracket arm having an aperture therein;

said bucket including a bucket pin mounted on one side portion thereof, the bucket pin received inside the aperture of the bucket arm when said bucket is slidably engaged between said bracket and the conveyor belt, the bracket arm and the bracket pin are secured together to hold said bucket in place on the conveyor belt.

* * * * *